(12) United States Patent
Baldacci

(10) Patent No.: US 12,546,756 B2
(45) Date of Patent: Feb. 10, 2026

(54) MIXTURE OF ISOMERS OF AMINAPHTONE, ANALYTICAL METHOD FOR IDENTIFYING THEM AND PHARMACEUTICAL COMPOSITION COMPRISING SAID ISOMERS

(71) Applicant: LABORATORI BALDACCI S.P.A., Pisa (IT)

(72) Inventor: Massimo Baldacci, Pisa (IT)

(73) Assignee: LABORATORI BALDACCI S.P.A., Pisa (IT)

( * ) Notice: Subject to any disclaimer, the term of this patent is extended or adjusted under 35 U.S.C. 154(b) by 940 days.

(21) Appl. No.: 17/608,907

(22) PCT Filed: May 5, 2020

(86) PCT No.: PCT/EP2020/062464
§ 371 (c)(1),
(2) Date: Nov. 4, 2021

(87) PCT Pub. No.: WO2020/225264
PCT Pub. Date: Nov. 12, 2020

(65) Prior Publication Data
US 2022/0299489 A1 Sep. 22, 2022

(30) Foreign Application Priority Data
May 6, 2019 (IT) .................. 102019000006572

(51) Int. Cl.
| | |
|---|---|
| *G01N 30/86* | (2006.01) |
| *C07C 229/60* | (2006.01) |
| *G01N 30/36* | (2006.01) |
| *G01N 30/88* | (2006.01) |
| *G01N 33/15* | (2006.01) |

(52) U.S. Cl.
CPC ....... *G01N 30/8658* (2013.01); *C07C 229/60* (2013.01); *G01N 30/36* (2013.01); *G01N 33/15* (2013.01); *C07B 2200/09* (2013.01); *G01N 2030/884* (2013.01)

(58) Field of Classification Search
CPC .............. G01N 30/8658; G01N 30/36; G01N 2030/884; C07C 229/60; C01N 33/15; C07B 2200/09
See application file for complete search history.

(56) References Cited

U.S. PATENT DOCUMENTS
2006/0118488 A1   6/2006   Timperman et al.

FOREIGN PATENT DOCUMENTS
| | | | |
|---|---|---|---|
| EP | 2390246 A1 * | 11/2011 | ................ A61P 9/00 |
| WO | WO-2007116297 A2 * | 10/2007 | ................ A61P 9/00 |

OTHER PUBLICATIONS

Zhang et al, Strategic Combination of Isocratic and Gradient Elution for Simultaneous Separation of Polar Compounds in Traditional Chinese Medicines by HPLC, Journal of Analytical Methods in Chemistry, vol. 2018, Mar. 19, 2018 (Year: 2018).*
Naveen Chhabra et al: "A review of drug isomerism and its significance", International Journal of Applied and Basic Medical Research, vol. 3, No. 1, Jan.-Jun. 2013, 3 pages, XP055257960.
Toennes, Stefan W et al: "Pitfall in cannabinoid analysis detection of a previously unrecognized interfering compound in human serum", Analytical and Bioanalytical Chemistry, Springer, DE, vol. 407, No. 2, Nov. 13, 2014 (Nov. 13, 2014), pp. 463-470, XP035431012.
Marziani, F. C. et al: "Liquid chromatographic separation of positional isomers of suprofen on a cyclodextrin-bonded phase", Journal of Chromatography A, Elsevier, Amsterdam, NL, vol. 465, No. 3, Jan. 1, 1989 (Jan. 1, 1989), pp. 422-428, XP026728884.
Stavros Kromidas: "More Practical Problem Solving in HPLC" Tip 05 & Tip 06; Jan. 1, 2005 (Jan. 1, 2005), Wiley-VHC, Weinheim, XP055657387.

* cited by examiner

*Primary Examiner* — Andrew D Kosar
*Assistant Examiner* — Phillip Matthew Rzeczycki
(74) *Attorney, Agent, or Firm* — POLSINELLI PC

(57) ABSTRACT

Provided are a mixture of positional isomers of aminaphtone, an aminaphtone product comprising the mixture and a new method of high-performance liquid chromatography (HPLC) useful for the characterization of aminaphtone. The method allows to identify in the positional isomers of which the aminaphtone in a product containing them and can be used to choose many aminaphtone mixtures suitable for pharmaceutical use.

19 Claims, 6 Drawing Sheets

MIXTURE OF ISOMERS OF AMINAPHTONE, ANALYTICAL METHOD FOR IDENTIFYING THEM AND PHARMACEUTICAL COMPOSITION COMPRISING SAID ISOMERS

CROSS REFERENCE TO RELATED APPLICATIONS

This application is a National Phase filing under 35 U.S.C. § 371 of PCT/EP2020/062464 filed on May 5, 2020; which application in turn claims priority to application No. 102019000006572 filed in Italy on May 6, 2019. The entire contents of each application are hereby incorporated by reference.

BACKGROUND OF THE INVENTION

Field of the Invention

The present invention concerns a mixture of isomers of aminaphtone, a pharmaceutical composition comprising them, and a method of analysis to detect said isomers.

Related Art

Aminaphtone is a compound with vasoprotective activity, which is used as a modulator/normalizer of changes in capillary vessels, in particular for treating pathological conditions such as chronic venous insufficiency.

Aminaphtone is the active substance of the commercially available drug Capillarema® (LABORATORI BALDACCI SpA, Italy), indicated for the treatment of states of capillary fragility.

Aminaphtone has always been deemed to be the compound 3-methyl-1,2,4-naphthalenetriol 2-(4-aminobenzoate), which has the following structural formula:

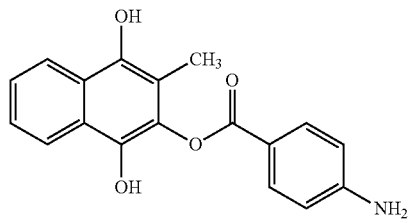 [SMILES: Cc1c(OC(=O)c2ccc(N)cc2)c(O)c2ccccc2c1O]

The synthesis of aminaphtone was described for the first time in U.S. Pat. No. 3,639,432. The multistage synthesis described in this patent provides, for the last two synthesis steps, first the formation of an ester bond between 2-hydroxy-3-methyl-1,4-naphthohydroquinone and a p-nitrobenzoyl halide in benzene, and subsequent catalytic hydrogenation under pressure in dioxane to give the final product.

EP 2390246 A1 describes a synthesis method which allows to obtain aminaphtone with a high degree of purity by reaction of 2-hydroxy-3-methyl-1,4-naphthohydroquinone and p-nitrobenzoyl chloride in toluene, and subsequent catalytic hydrogenation under reduced pressure in dioxolane, in the presence of a metal catalyst.

EP 2799426 A1 concerns a synthesis process of aminaphtone, which makes use of non-toxic solvents and reagents, under mild reaction and temperature conditions.

According to the prior art, no analytical method was available to separate and detect the specific components of the aminaphtone product obtained by the synthesis methods mentioned above, and in particular to separate and identify possible isomers of the aminaphtone molecule. Although this situation has been generally accepted, availability of a specific analytical method of separating and detecting possible structural isomers of aminaphtone would be desirable since it could provide accurate information about the product and its structure.

Furthermore, accurate information about the structure of the aminaphtone molecule would provide a powerful tool for controlling the product and its method of manufacturing.

SUMMARY OF THE INVENTION

According to an aspect, the present invention concerns a mixture of positional isomers of aminaphtone consisting of 3-methyl-1,2,4-naphthalenetriol 2-(4-aminobenzoate) (isomer A) and of 3-methyl-1,2,4-naphthalenetriol 1-(4-aminobenzoate) (isomer B), wherein isomer B is present in a greater quantity.

According to an aspect, the present invention concerns a mixture of positional isomers of aminaphtone consisting of 3-methyl-1,2,4-naphthalenetriol 2-(4-aminobenzoate) (isomer A) and of 3-methyl-1,2,4-naphthalenetriol 1-(4-aminobenzoate) (isomer B), wherein isomer B is at least 95% by weight of said mixture.

According to an aspect, the present invention concerns an aminaphtone product comprising a mixture of positional isomers consisting of 3-methyl-1,2,4-naphthalenetriol 2-(4-aminobenzoate) (isomer A) and of 3-methyl-1,2,4-naphthalenetriol 1-(4-aminobenzoate) (isomer B), wherein isomer B is present in a greater quantity.

According to still another aspect, the invention concerns a High-Performance Liquid Chromatography (HPLC) analytical method for identifying the positional isomers of aminaphtone in a product containing them, wherein the method comprises the elution of said product with a mobile phase consisting of two solutions having different polarity, wherein said elution comprises an alternation of at least one isocratic phase and of at least one linear gradient phase According to a further aspect, the invention concerns a pharmaceutical composition comprising a mixture of positional isomers A and B of aminaphtone and at least one physiologically acceptable excipient.

According to a still further aspect, the invention concerns a pharmaceutical composition comprising a mixture of positional isomers A and B of aminaphtone, wherein isomer B is at least 95% of said mixture, and at least one physiologically acceptable excipient.

BRIEF DESCRIPTION OF THE DRAWINGS

FIG. 7 shows a 1H-NMR spectrum of aminaphtone.

DETAILED DESCRIPTION OF THE INVENTION

Figure 1:
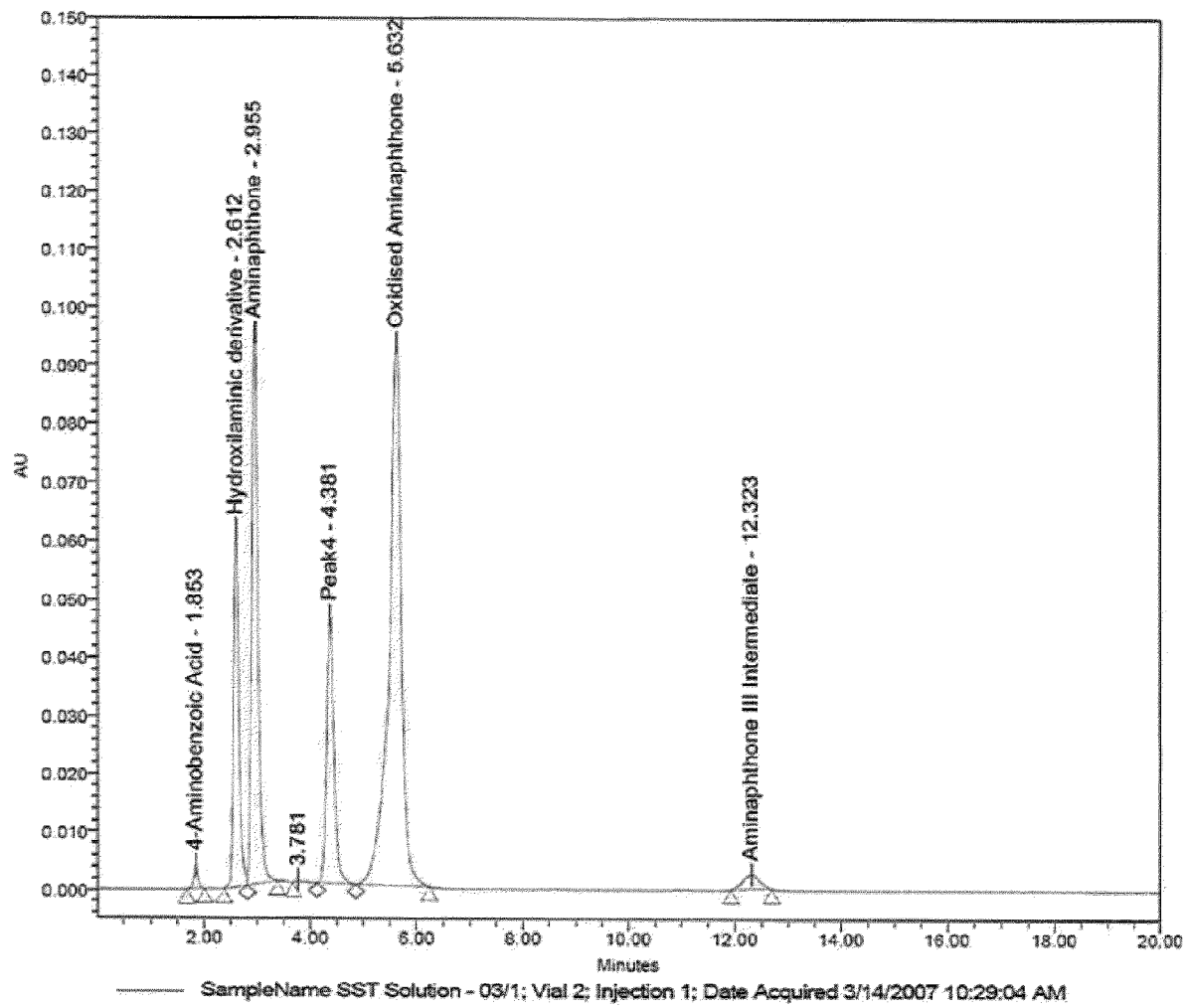
FIG. 1 shows a HPLC chromatogram obtained in Example 1.

Unless otherwise defined in the present description, all the terms of the specific technical field, notations and other scientific terms used are intended to have the meaning commonly understood by the persons skilled in the art to which this invention belongs. In some cases, terms with commonly understood meanings are defined here for clarity and/or for quick reference. The inclusion of these definitions in this description should therefore not be interpreted as representative of a substantial difference compared to what is generally included in the art.

The term "physiologically acceptable excipient" refers to a substance devoid of any proper pharmacological effect and which does not produce adverse reactions when administered to a mammal, preferably to a human being. Physiologically acceptable excipients are well known in the art and are described, for example in the Handbook of Pharmaceutical Excipients, sixth edition 2009, incorporated herein by reference.

The term "positional isomers" refers to structural isomers also called position isomers, regio-isomers or chain isomers. These are compounds that have identical molecular formula but differ from each other as their carbon atoms are joined together in a different order.

With reference to Liquid Chromatography, the term "isocratic elution" refers to the method in which a single solvent or a mixture of solvents of constant composition is used as the mobile phase, i.e. the composition of the mobile phase remains unchanged over time.

The term "gradient elution" refers to the method in which a mixture of solvents is used as the mobile phase, the composition of which is made to vary continuously during the elution process. The terms "comprising", "having", "including" and "containing" are to be understood as open terms (i.e. the meaning "comprising, but not limited to") and are to be considered as a support also for terms such as "consist essentially of", "consisting essentially of", "consist of" or "consisting of". The terms "essentially consists of", "essentially consisting of" are to be understood as semi-closed terms, which means that no other ingredient that affects the new features of the invention is included, but optional excipients can therefore be included. The terms "consists of", "consisting of" are to be understood as terms closed. It has now been surprisingly found, thanks to a new and original HPLC chromatographic method, which will be described in the following, that the aminaphtone product obtained by the known synthesis methods comprises a mixture of two positional isomers identified as 3-methyl-1,2,4-naphthalenetriol 2-(4-aminobenzoate) (isomer A), and 3-methyl-1,2,4-naphthalenetriol 1-(4-aminobenzoate) (isomer B), having the following formulae:

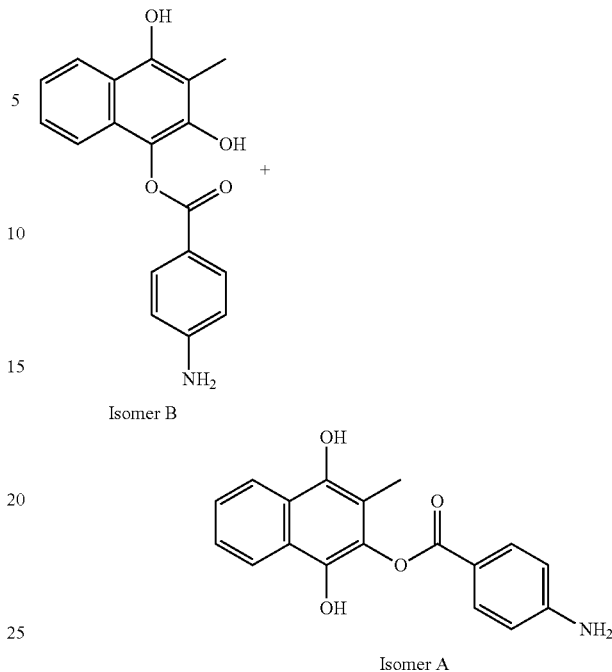

Isomer B

Isomer A

With reference to the mixture A+B, isomer B is at least 95% by weight of the mixture. Being the molecular formula the same, with reference to the mixture of these two isomers only, the amount by weight of the isomers is the same as the amount by mole. In the present description reference is usually made to percent by weight, or wt %.

With reference to the product aminaphtone obtained via the known synthetic processes, the mixture consisting of isomer A and isomer B is at least 90% by weight of the product.

With reference to EP 2390246 A1, aminaphtone can be prepared by a manufacturing process including the catalytic hydrogenation, in the presence of a catalyst and in dioxolane, of the compound of formula (II)

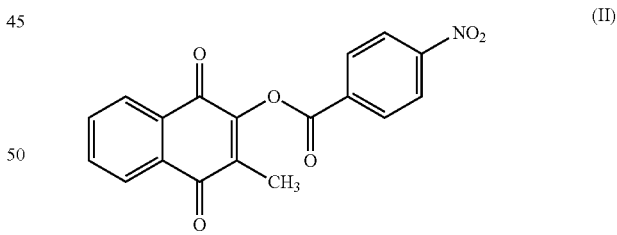

which is then converted via a hydrogenation reduction reaction to the end product:

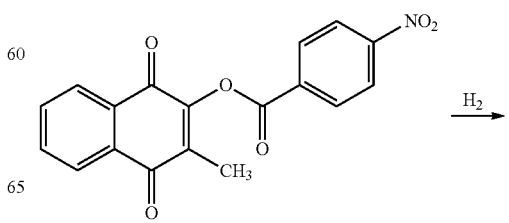

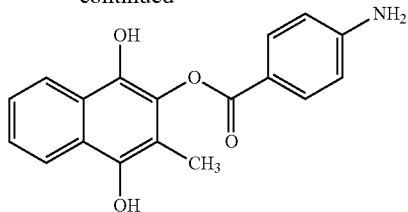

With reference to EP 2799426 A1, aminaphtone can be prepared by a manufacturing process according to the following scheme:

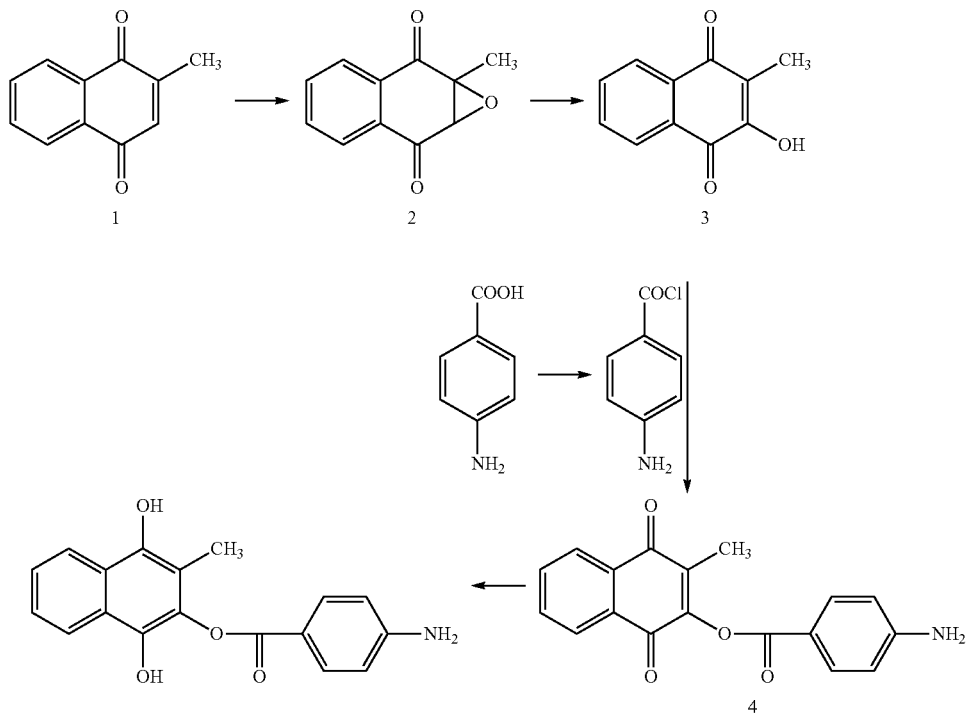

As it can be noted, each reaction scheme above indicates as end product the structural formula of isomer A.

As mentioned above, however, an analysis with the new HPLC method of the aminaphtone obtained with the known production processes of EP 2390246 A1 or EP 2799426 A1 revealed that the amount of isomer A in the mixture A+B varies from 5 wt % to less than 1 wt %. This is a surprising result since it was commonly believed that aminaphtone was only the compound of formula A. Even more surprising is that isomer A is a non-prevailing isomer, while the prevailing isomer is the previously unidentified isomer B. It is believed that the compound reaches an equilibrium composition of the two positional isomers when dissolved in a solvent. Identification of isomer B and determination of the relative amounts of isomers A and B in the binary mixture has been made possible by the HPLC analytical method that is also an aspect of the present invention.

The structure of the two isomers has been further confirmed by various techniques such as HPLC-MS, NMR, XR analysis.

Chromatography is defined as a procedure by which solutes are separated by a differential dynamic distribution process in a system consisting of two phases, one of which is the mobile phase and the other the stationary phase.

High-Performance Liquid Chromatography (HPLC) is a versatile and high-resolution approach to separate two or more compounds present in a solvent by exploiting the affinity balance between a "stationary phase" placed inside the chromatographic column and a "phase mobile" that flows through it.

At the end of the column there is a detector suitable for measuring the quantity of analyte that is eluted from the column, for example a detector of the UV, MS or RID type.

In the case of aminaphtone, the inventors have found that the use of an isocratic elution (acetonitrile/water/acetic acid) did not allow the identification of two isomers, but only of one aminaphtone compound, identified with the formula of isomer A. Instead, by means of the HPLC method according to the invention, in which the isocratic elution is alternated with the linear gradient elution, the inventors have unexpectedly found that aminaphtone has two positional isomers, and identified for the first time the positional isomer B of aminaphtone.

Therefore, aminaphtone is made up of up to about 5% of the isomer A and of at least about 95% of the isomer B. The pharmacological and clinical properties of the product comprising the mixture of the two positional isomers remain unchanged with respect to the clinical efficacy of the aminaphtone reported in the scientific literature.

The new HPLC method for identifying the positional isomers A and B in the aminaphtone product includes the elution of said product with a mobile phase consisting of two solutions having different polarity, i.e. one a more polar solution and a less polar solution, wherein said elution comprises an alternation of at least one isocratic phase and at least one linear gradient phase.

In a preferred embodiment, the analytical method according to the invention comprises an alternation of isocratic phases and linear gradient phases, passing from more polar solutions to less polar solutions.

According to an aspect, the analytical method according to the invention comprises an alternation of isocratic phases and linear gradient phases which are repeated at least 3 times.

According to a further aspect, the more polar solution, i.e. the mobile phase A, comprises a solution A being 0.5% of acetic acid in water, and a solution C being 0.5% of acetic acid in acetonitrile diluted in methanol in a 60:40 volume ratio.

In a preferred embodiment, the less polar solution, i.e. the mobile phase B, comprises a solution A being 0.5% of acetic acid in water, and a solution C being 0.5% of acetic acid in acetonitrile diluted in methanol in a 35:65 volume report.

The analytical method described above, however, can be implemented by using different mobile phases, both as to the type of solvents used and the volume ratios used, following the teachings of the Pharmacopoeia.

In a preferred embodiment, the elution of the product was obtained using the following conditions: (i) a first isocratic elution with 100% phase A from the injection time up to 3 minutes;
(ii) a first linear gradient with from 100% at 60% phase A in the following 7 minutes;
(iii) a second isocratic elution with 60% phase A from time 10 to 15 minutes;
(iv) a second linear gradient with from 60% to 0% phase A for 5 minutes;
(v) a third isocratic elution with 0% phase A for 10 minutes;
(vi) a third linear gradient with from 0% to 100% phase A for 1 minute, and finally;
(vii) a fourth isocratic elution with 100% phase A from time 31 to 40 minutes. (total running time 40 min).

The volume percentage of the most polar solution decreased over time up to about half of the total run time, and then increases until the end of the run. Consequently, the volume percentage of the less polar solution increased over time to about half of the total run time, then decreased until the end of the run.

The stationary phase of the chromatographic column, which can be used in the method of the present invention, contains alkyl chains.

In a preferred embodiment, the stationary phase consists of particles of support material, such as for example silica, containing the alkyl chains preferably of the type C18, C8 or C4. Preferably, the stationary phase of the chromatographic column is a silica gel bound to C18. This chromatographic column can be equipped with a detector, preferably of the UV, MS or RID type; more preferably of the UV type.

The inventors unexpectedly found that the alternate elution method, i.e. with isocratic and linear gradient, according to the invention, compared to an isocratic only method, allowed to identify the presence of the two positional isomers, called isomer A and isomer B, as defined above, of which the aminaphtone active substance is made, which reach an equilibrium composition in solution, wherein the isomer B is present in a larger quantity.

The identification of the isomer B as prevailing positional isomer of aminaphtone and the determination of the relative amount of isomer A and isomer B in the active pharmaceutical ingredient (API) is important since it allows to use the binary mixture A+B as reference standard product for the quality of the API and for controlling the production process. As mentioned above, in the product aminaphtone obtained via the known synthetic process, the mixture consisting of isomer A and isomer B is at least 90% by weight of the product. In addition to the usual quality control on the limit of impurities in the product, also the ratio of the isomers A and B in the binary mixture A+B is a quality control tool that is made available to the manufacturer as it has been found that the amount of isomer A in the mixture A+B varies from 5 wt % to less than 1 wt %, and that isomer B is never present in an amount of less than 95 wt %.

The following examples are intended to further illustrate the invention without however limiting it.

EXAMPLES

Aminaphtone used in the following examples was prepared with the method previously described in European patent application EP 2390246 A1.

Example 1

Sample Preparation

A sample containing aminaphtone to which other impurities were added, including oxidized aminaphtone and chlorinated aminaphtone, was prepared to test the resolving power of the conventional analytical method.

75 mg the sample were weighed, transferred to a 100 mL flask and diluted to 100 ml with the mobile phase, then stirred until completely dissolved. 2 ml of this solution were diluted to 20 ml with the mobile phase.

20 µl of this solution were Injected and the chromatogram was recorded for 20 minutes.

| Operating conditions | |
|---|---|
| Chromatograph | HPLC Waters 2695 Alliance |
| Detector: | UV at 300 nm |
| Column: | Phenomenex C18 Length: 150 nm ID: 4.6 mm |
| Column temperature | 30° C. |
| Injection volume: | 20 µl |
| Mobile phase: | Acetonitrile - water:acetic acid 550:450:5 v/v/v |
| Flow: | 1.0 ml/min |
| Duration of run: | 20 min |

The chromatogram obtained is shown in FIG. 1.

The previously known analytical method, used in Ex. 1 as a comparative method, which involves the use of an isocratic acetonitrile/water/acetic acid elution), did not allow to identify the presence of two isomers but only one aminaphtone compound at a retention time (RT) of 2.955.

Example 2

Sample Preparation

Another sample containing aminaphtone to which other impurities were added, including oxidized aminaphtone and chlorinated aminaphtone, was prepared to test the resolving power of the new analytical method.

36 mg of the sample were weighed, transferred to a 100 mL flask and diluted to 100 ml with the diluting solution, then stirred until completely dissolved.

20 µl of this solution were injected and the chromatogram was recorded for 40 minutes.

| Operating conditions | |
|---|---|
| Chromatograph | HPLC Waters 2695 Alliance |
| Detector: | UV at 300 nm |
| Column: | Kromasil C18 |
| | Lenght: 100 nm |
| | ID: 4.6 mm |
| Column temperature: | 25° C. |
| Injection volume: | 20 µl |
| Mobile phase: | Phase A: 600 ml Sol. A + 400 ml Sol. C |
| | Phase B: 350 ml Sol. A + 650 ml Sol. C |
| | Sol. A: 5 ml of acetic acid in 1000 ml H₂O |
| | Sol. B: 5 ml of acetic acid in 1000 ml ACN |
| | Sol. C: 1000 ml of Sol. B + 600 ml di MeOH |
| Flow: | 1.0 ml/min |
| Duration of run | 40 min |

Diluent Solution: Mobile Phase B/Methanol 50/50 v/v.

| Time (min) | Phase A % (v/v) | Phase B % (v/v) | Gradient |
|---|---|---|---|
| 0 | 100 | 0 | Isocratic |
| 3-10 | 100 -> 60 | 0 -> 40 | Linear |
| 10-15 | 60 | 40 | Isocratic |
| 15-20 | 60 -> 0 | 40 -> 100 | Linear |
| 20-30 | 0 | 100 | Isocratic |
| 30-31 | 0 -> 100 | 100 -> 0 | Linear |
| 31-40 (end of run) | 100 | 0 | Isocratic |

Figure 2:
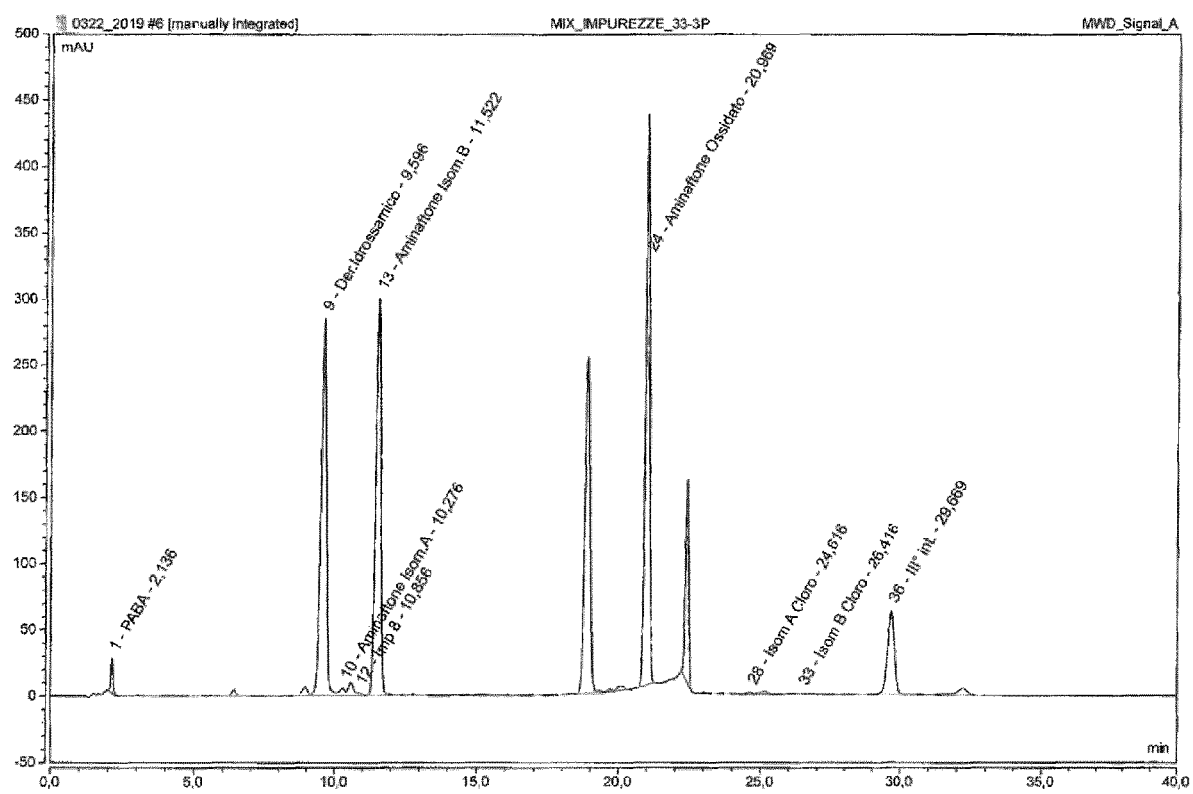
FIG. 2 shows a HPLC chromatogram obtained in Example 2.

The chromatogram obtained is shown in FIG. 2 and the relevant data are reported in the table below:

| No. | Peak Name | Retention Time min. |
|---|---|---|
| 1 | PABA* | 2.136 |
| 9 | Hydroxamic Derivative | 9.596 |
| 10 | Aminaphtone Isomer A | 10.276 |
| 12 | Imp. 8 Hydrogenated aminaphtone | 10.856 |
| 13 | Aminaphtone Isomer B | 11.522 |
| 24 | Oxidized Aminaphtone | 20.969 |
| 28 | Chlorinated Isom. A | 24.616 |
| 33 | Chlorinated Isom. B | 26.416 |
| 36 | Intermediate III | 29.669 |

*PABA = p-aminobenzoic acid

The alternating (isocratic and linear gradient) elution method according to the invention allowed to identify the positional isomer A (3-methyl-1,2,4-naphthalenetriol 2-(4-aminobenzoate)) at a retention time (RT) of 10.276 and the positional isomer B (3-methyl-1,2,4-naphthalenetriol 1-(4-aminobenzoate)) at a retention time (RT) of 11.522.

Example 3

Sample Preparation

A sample of aminaphtone as obtained from a lot of the production process, namely without addition of impurities, was used to test the resolving power of the conventional analytical method.

75 mg the sample were weighed, transferred to a 100 mL flask and diluted to 100 ml with the mobile phase, then stirred until completely dissolved. 2 ml of this solution were diluted to 20 ml with the mobile phase.

20 µl of this solution were Injected and the chromatogram was recorded for about 20 minutes, until elution of the compound defined as Intermediate III.

| Operating conditions | |
|---|---|
| Chromatograph | HPLC Agilent 1260 Infinity |
| Detector: | UV at 300 nm |
| Column: | Phenomenex C18 |
| | Length: 150 nm |
| | ID: 4.6 mm |
| Column temperature | 30° C. |
| Injection volume: | 20 µl |
| Mobile phase: | Acetonitrile - water:acetic acid 550:450:5 v/v/v |
| Flow: | 1.0 ml/min |
| Duration of run: | 20 min |

Figure 3:
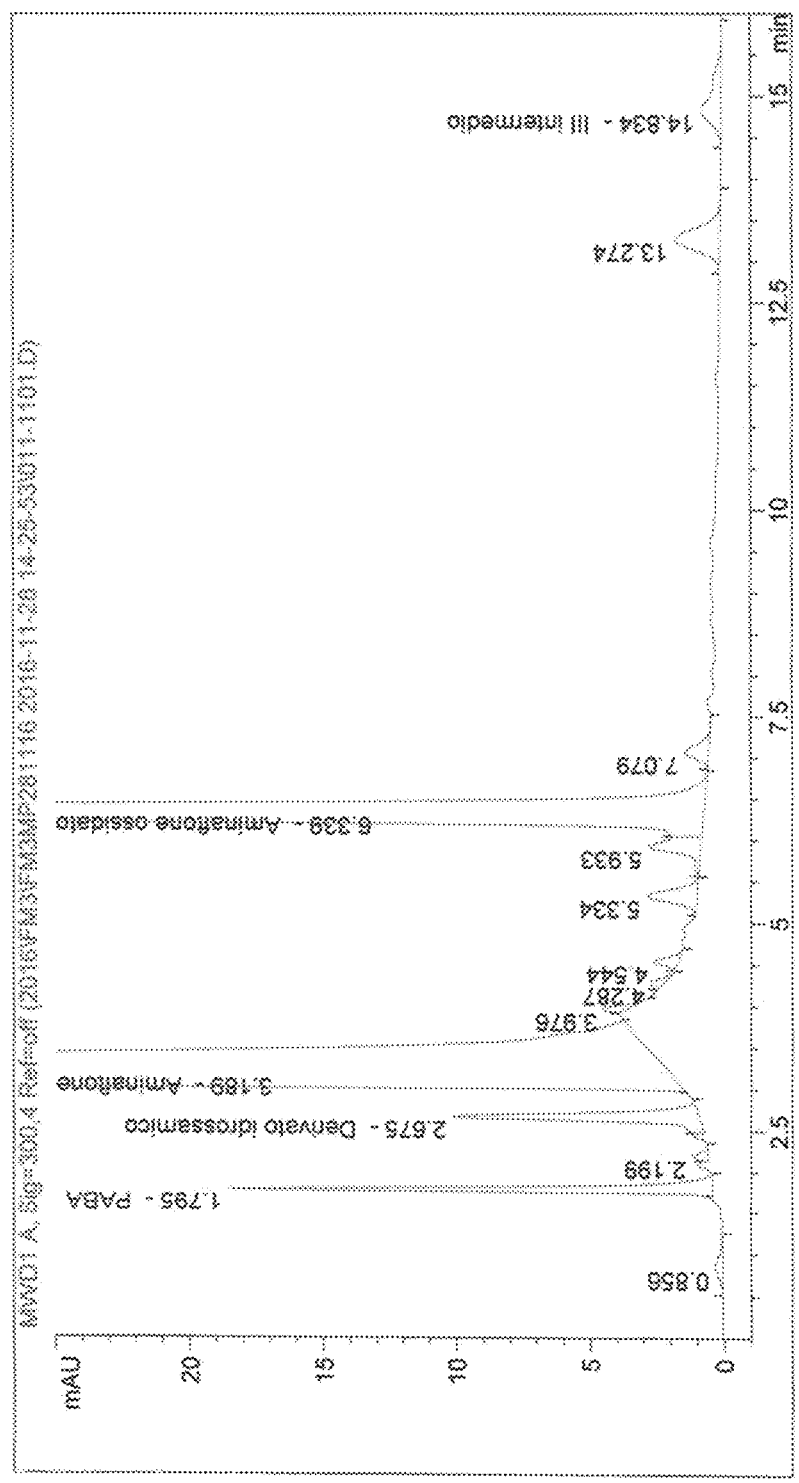
FIG. 3 shows a HPLC chromatogram obtained in Example 3.

The chromatogram obtained is shown in FIG. 3 and the relevant data are reported in the table below:

| RT [min] | Name | Area | Height | Amount [%] | Area % |
|---|---|---|---|---|---|
| 0.856 | | 4.71878 | 0.264 | 0.00000 | 0.023 |
| 1.795 | PABA* | 72.57023 | 18.079 | 1.93771 | 0.356 |
| 2.199 | | 3.19324 | 0.590 | 0.00000 | 0.016 |
| 2.675 | Hydroxamic Derivative | 61.03141 | 9.205 | 0.00000 | 0.299 |
| 3.189 | Aminaphtone | 1.86918e4 | 2.356e3 | 645.30107 | 91.622 |
| 3.976 | | 4.62198 | 0.848 | 0.00000 | 0.023 |
| 4.287 | | 2.93989 | 0.456 | 0.00000 | 0.014 |
| 4.544 | | 5.914425 | 0.895 | 0.00000 | 0.029 |
| 0.000 | Peak 4 | 0.00000 | 0.000 | 0.00000 | 0.000 |
| 5.334 | | 19.64299 | 1.875 | 0.00000 | 0.096 |
| 5.933 | | 21.58794 | 1.957 | 0.00000 | 0.106 |
| 6.339 | Oxidized Aminaphtone | 1448.40491 | 162.353 | 44.81344 | 7.100 |
| 7.079 | | 11.08747 | 0.900 | 0.00000 | 0.054 |
| 13.274 | | 31.49338 | 1.680 | 0.00000 | 0.154 |
| 14.834 | Intermediate III | 22.09411 | 0.751 | 0.00000 | 0.108 |
| | Totals: | | | 692.05222 | |

*PABA = p-aminobenzoic acid

The previously known analytical method, used in Ex. 1 as a comparative method, which involves the use of an isocratic acetonitrile/water/acetic acid elution), did not allow to identify the presence of two isomers but only one aminaphtone compound, at a retention time (RT) of 3.189.

Example 4

Sample Preparation 36 mg of a sample of aminaphtone as obtained from the same lot of the production process of Example 3 were weighed, transferred to a 100 mL flask and diluted to 100 ml with the diluting solution, then stirred until completely dissolved.

20 µl of this solution were injected and the chromatogram was recorded for 40 minutes according to the new analytical method.

| Operating conditions | |
|---|---|
| Chromatograph | HPLC Agilent 1260 Infinity |
| Detector: | UV at 300 nm |
| Column: | Kromasil C18 |
| | Lenght: 100 nm |
| | ID: 4.6 mm |
| Column temperature: | 25° C. |
| Injection volume: | 20 µl |
| Mobile phase: | Phase A: 600 ml Sol. A + 400 ml Sol. C |
| | Phase B: 350 ml Sol. A + 650 ml Sol. C |
| | Sol. A: 5 ml of acetic acid in 1000 ml H₂O |
| | Sol. B: 5 ml of acetic acid in 1000 ml ACN |
| | Sol. C: 1000 ml of Sol. B + 600 ml di MeOH |

-continued

| Operating conditions | |
|---|---|
| Flow: | 1.0 ml/min |
| Duration of run | 40 min |

Diluent Solution: Mobile Phase B/Methanol 50/50 v/v.

| Time (min) | Phase A % (v/v) | Phase B % (v/v) | Gradient |
|---|---|---|---|
| 0 | 100 | 0 | Isocratic |
| 3-10 | 100 -> 60 | 0 -> 40 | Linear |
| 10-15 | 60 | 40 | Isocratic |
| 15-20 | 60 -> 0 | 40 -> 100 | Linear |
| 20-30 | 0 | 100 | Isocratic |
| 30-31 | 0 -> 100 | 100 -> 0 | Linear |
| 31-40 (end of run) | 100 | 0 | Isocratic |

Figure 4:
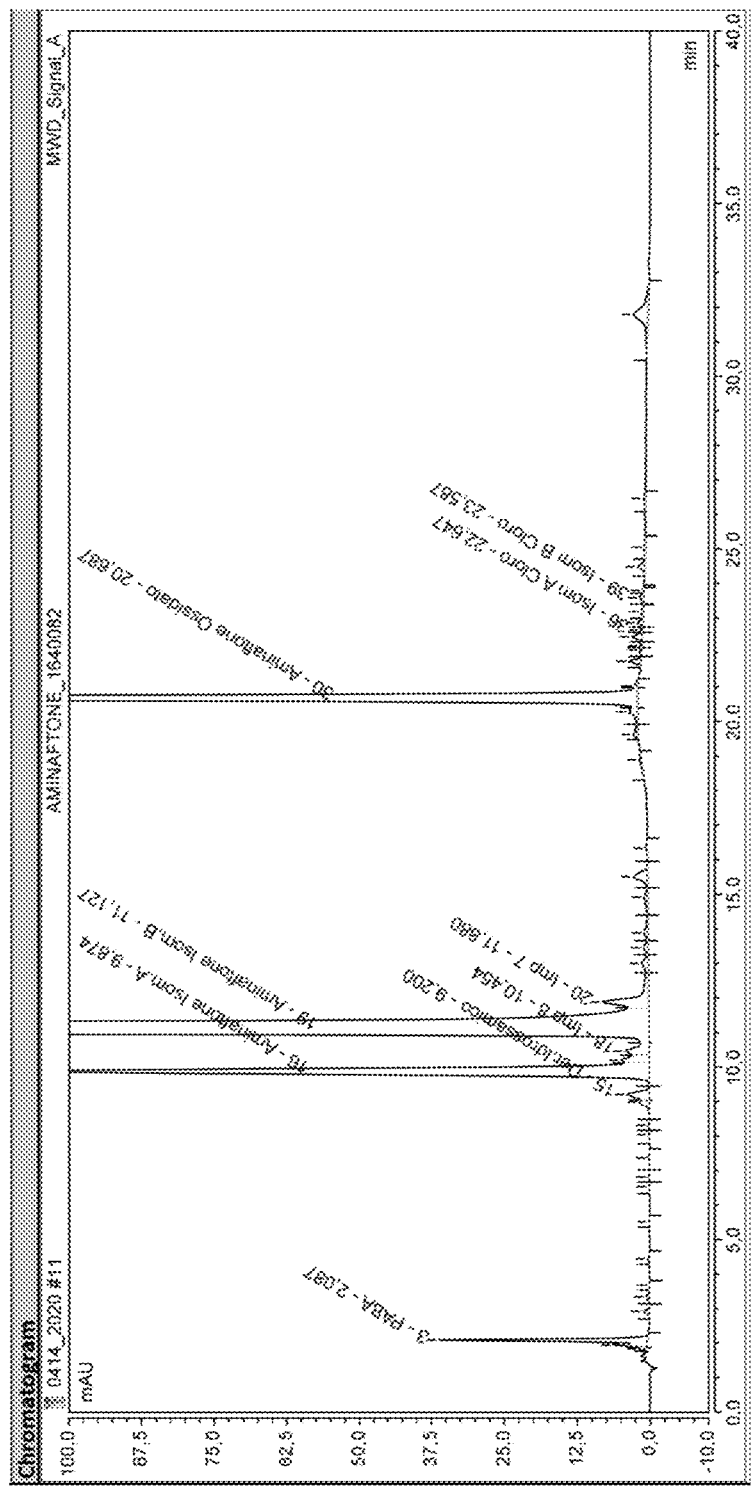
FIG. 4 shows a HPLC chromatogram obtained in Example 4.

The chromatogram obtained is shown in FIG. 4 and the relevant data are reported in the table below:

| No. | Peak Name | Retention Time min. | Rel. Ret. Time. | Area mAU*min | Rel. Area % |
|---|---|---|---|---|---|
| 3 | PABA* | 2.087 | 0.21 | 3.112652 | 0.53 |
| 15 | Hydroxamic Derivative | 9.200 | 0.93 | 0.780548 | 0.13 |
| 16 | Aminaphtone Isomer A | 9.874 | 1.00 | 20.821377 | 3.54 |
| 18 | Imp 8 Hydrogenated aminaphtone | 10.454 | 1.06 | 1.015694 | 0.17 |
| 19 | Aminaphtone Isomer B | 11.127 | 1.00 | 518.058213 | 88.13 |
| 20 | Imp 7 Hydrogenated aminaphtone | 11.880 | 1.20 | 2.211966 | 0.38 |
| 30 | Oxidized Aminaphtone | 20.687 | 2.10 | 34.634955 | 5.89 |
| 36 | Chlorinated Isom. A | 22.647 | 2.29 | 0.047982 | 0.01 |
| 39 | Chlorinated Isom. B | 23.587 | 2.39 | 0.149898 | 0.03 |
| | Total: | | | 580.833285 | 98.81 |

*PABA = p-aminobenzoic acid

The alternating (isocratic and linear gradient) elution method according to the invention allowed to identify the positional isomer A (3-methyl-1,2,4-naphthalenetriol 2-(4-aminobenzoate)) at a retention time (RT) of 9.874 and the positional isomer B (3-methyl-1,2,4-naphthalenetriol 1-(4-aminobenzoate)) at a retention time (RT) of 11.127.

From integration of the area of the peaks it could be determined that the sample contained 3.54 wt % of isomer A and 88.13 wt % of isomer B.

With reference to the binary mixture of isomer A and isomer B, the relative amount is 96.14 wt % of isomer B and 3.86 wt % of isomer A, simply obtained as:

% of B=(B/A+B)·100; % of A=(A/A+B)·100

Example 5

Sample Preparation 36 mg of a sample of aminaphtone as obtained from a lot of the production process different from the lot of Examples 3 and 4 were weighed, transferred to a 100 mL flask and diluted to 100 ml with the diluting solution, then stirred until completely dissolved.

20 µl of this solution were injected and the chromatogram was recorded for 40 minutes according to the new analytical method.

| Operating conditions | |
|---|---|
| Chromatograph | HPLC Agilent 1260 Infinity |
| Detector: | UV at 300 nm |
| Column: | Kromasil C18 |
| | Lenght: 100 nm |
| | ID: 4.6 mm |
| | granulometry: 5 µm |
| Column temperature: | 25° C. |
| Injection volume: | 20 µl |
| Mobile phase: | Phase A: 600 ml Sol. A + 400 ml Sol. C |
| | Phase B: 350 ml Sol. A + 650 ml Sol. C |
| | Sol. A: 5 ml of acetic acid in 1000 ml H$_2$O |
| | Sol. B: 5 ml of acetic acid in 1000 ml ACN |
| | Sol. C: 1000 ml of Sol. B + 600 ml di MeOH |
| Flow: | 1.0 ml/min |
| Duration of run | 40 min |

Diluent Solution: Mobile Phase B/Methanol 50/50 v/v

| Time (min) | Phase A % (v/v) | Phase B % (v/v) | Gradient |
|---|---|---|---|
| 0 | 100 | 0 | Isocratic |
| 3-10 | 100 -> 60 | 0 -> 40 | Linear |
| 10-15 | 60 | 40 | Isocratic |
| 15-20 | 60 -> 0 | 40 -> 100 | Linear |
| 20-30 | 0 | 100 | Isocratic |
| 30-31 | 0 -> 100 | 100 -> 0 | Linear |
| 31-40 (end of run) | 100 | 0 | Isocratic |

Figure 5:
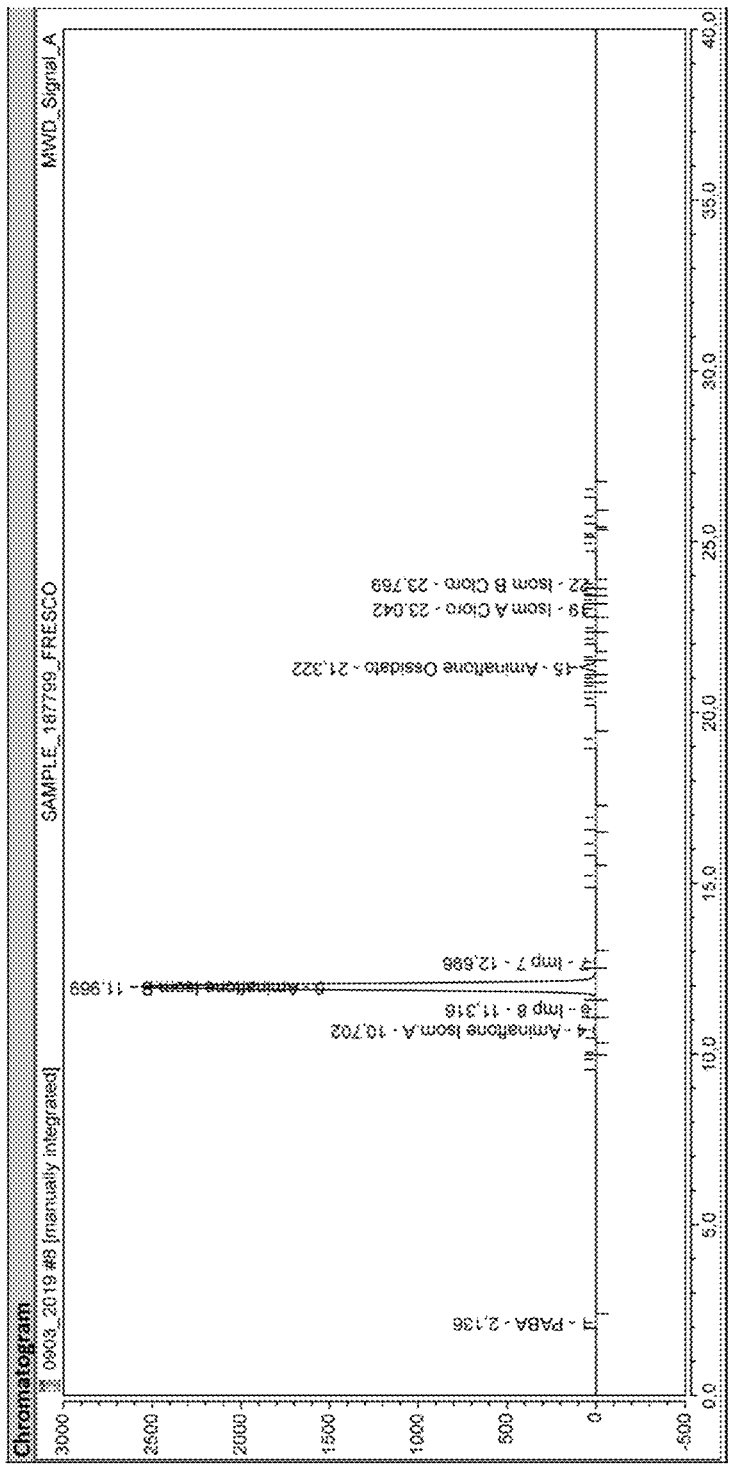
FIG. 5 shows a HPLC chromatogram obtained in Example 5.

The chromatogram obtained is shown in FIG. 5 and the relevant data are reported in the table below:

| No. | Peak Name | Retention Time min. | Rel. Ret. Time. | Area mAU*min | Rel. Area % |
|---|---|---|---|---|---|
| 1 | PABA* | 2.136 | 0.20 | 0.479349 | 0.09 |
| 4 | Aminaphtone Isomer A | 10.702 | 1.00 | 3.643583 | 0.66 |
| 5 | Imp 8 Hydrogenated aminaphtone | 11.316 | 1.06 | 0.581092 | 0.11 |
| 6 | Aminaphtone Isomer B | 11.969 | 1.00 | 528.237029 | 96.28 |
| 7 | Imp 7 Hydrogenated aminaphtone | 12.696 | 1.19 | 1.645266 | 0.30 |
| 15 | Oxidized Aminaphtone | 21.322 | 1.99 | 11.842590 | 2.16 |
| 19 | Chlorinated Isom. A | 23.042 | 2.15 | 0.406816 | 0.07 |
| 22 | Chlorinated Isom. B | 23.769 | 2.22 | 0.015696 | 0.00 |
| | Total: | | | 546.851420 | 99.68 |

*PABA = p-aminobenzoic acid

The alternating (isocratic and linear gradient) elution method according to the invention allowed to identify the positional isomer A (3-methyl-1,2,4-naphthalenetriol 2-(4-aminobenzoate)) at a retention time (RT) of 10.702 and the positional isomer B (3-methyl-1,2,4-naphthalenetriol 1-(4-aminobenzoate)) at a retention time (RT) of 11.969. From integration of the area of the peaks it could be determined that the sample contained 0.66 wt % of isomer A and 96.28 wt % of isomer B.

With reference to the binary mixture of isomer A and isomer B, the relative amount is 99.32 wt % of isomer B and 0.68 wt % of isomer A, simply obtained as:
% of B=(B/A+B)·100; % of A=(A/A+B)·100

Example 6

Sample Preparation 36 mg of a sample of aminaphtone as obtained from a lot of the production process different from the lots of Examples 3, 4 and 5 were weighed, transferred to a 100 mL flask and diluted to 100 ml with the diluting solution, then stirred until completely dissolved.

20 µl of this solution were injected and the chromatogram was recorded for 40 minutes according to the new analytical method.

| Operating conditions | |
| --- | --- |
| Chromatograph | HPLC Agilent 1260 Infinity |
| Detector: | UV at 300 nm |
| Column: | Kromasil C18 |
| | Lenght: 100 nm |
| | ID: 4.6 mm |
| Column temperature: | 25° C. |
| Injection volume: | 20 µl |
| Mobile phase: | Phase A: 600 ml Sol. A + 400 ml Sol. C |
| | Phase B: 350 ml Sol. A + 650 ml Sol. C |
| | Sol. A: 5 ml of acetic acid in 1000 ml $H_2O$ |
| | Sol. B: 5 ml of acetic acid in 1000 ml ACN |
| | Sol. C: 1000 ml of Sol. B + 600 ml di MeOH |
| Flow: | 1.0 ml/min |
| Duration of run | 40 min |

Diluent Solution: Mobile Phase B/Methanol 50/50 v/v

| Time (min) | Phase A % (v/v) | Phase B % (v/v) | Gradient |
| --- | --- | --- | --- |
| 0 | 100 | 0 | Isocratic |
| 3-10 | 100 -> 60 | 0 -> 40 | Linear |
| 10-15 | 60 | 40 | Isocratic |
| 15-20 | 60 -> 0 | 40 -> 100 | Linear |
| 20-30 | 0 | 100 | Isocratic |
| 30-31 | 0 -> 100 | 100 -> 0 | Linear |
| 31-40 (end of run) | 100 | 0 | Isocratic |

Figure 6:
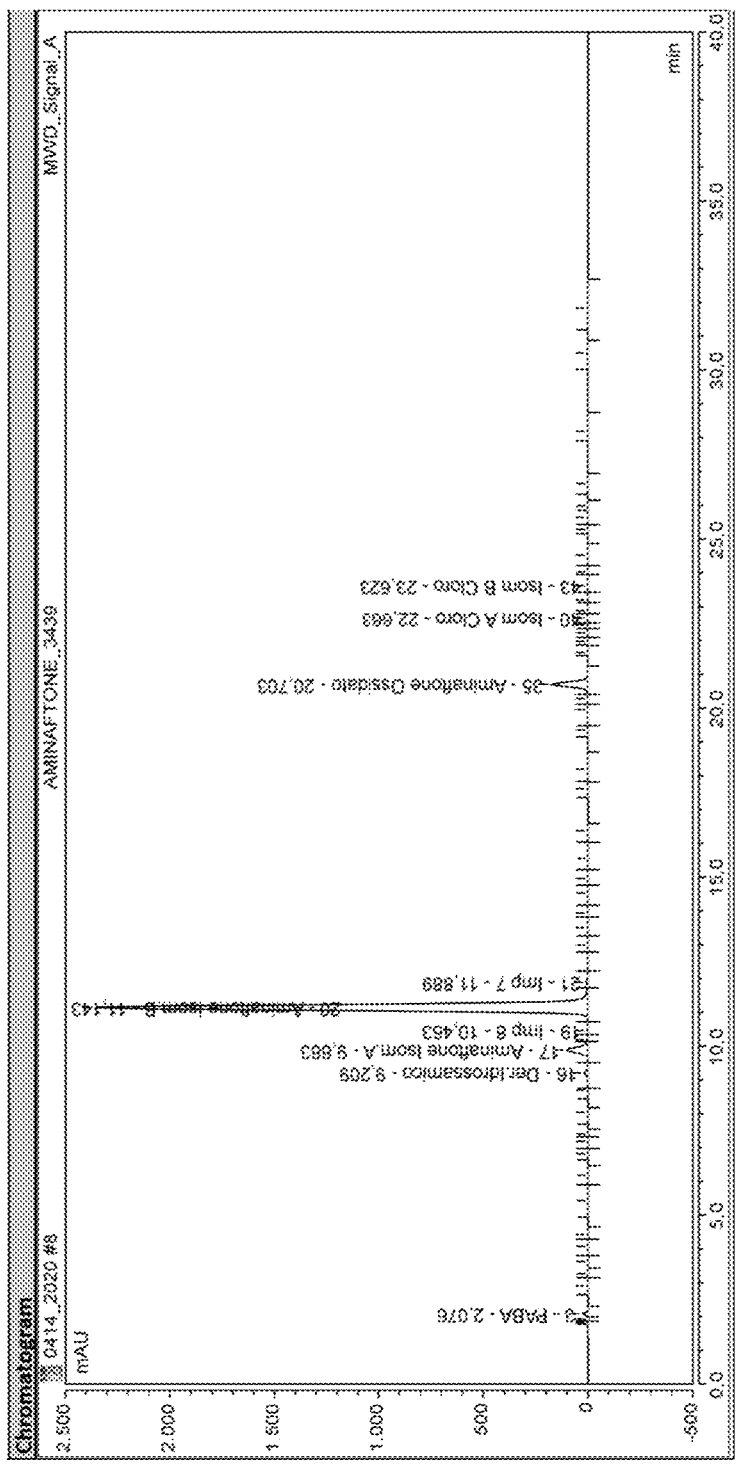
FIG. 6 shows a HPLC chromatogram obtained in Example 6.

The chromatogram obtained is shown in FIG. 6 and the relevant data are reported in the table below:

| No. | Peak Name | Retention Time min. | Rel. Ret. Time. | Area mAU*min | Rel. Area % |
| --- | --- | --- | --- | --- | --- |
| 3 | PABA* | 2.076 | 0.21 | 2.663022 | 0.50 |
| 16 | Hydroxamic Derivative | 9.209 | 0.93 | 3.867660 | 0.73 |
| 17 | Aminaphtone Isomer A | 9.883 | 1.00 | 20.142180 | 3.81 |
| 19 | Imp 8 Hydrogenated aminaphtone | 10.463 | 1.06 | 0.918469 | 0.17 |
| 20 | Aminaphtone Isomer B | 11.143 | 1.00 | 461.817074 | 87.46 |
| 21 | Imp 7 Hydrogenated aminaphtone | 11.889 | 1.20 | 1.949629 | 0.37 |
| 35 | Oxidized Aminaphtone | 20.703 | 2.09 | 28.452021 | 5.39 |
| 40 | Chlorinated Isom. A | 22.663 | 2.29 | 0.401222 | 0.08 |
| 43 | Chlorinated Isom. B | 23.623 | 2.39 | 0.273633 | 0.05 |
| | Total: | | | 520.484908 | 98.57 |

*PABA = p-aminobenzoic acid

The alternating (isocratic and linear gradient) elution method according to the invention allowed to identify the positional isomer A (3-methyl-1,2,4-naphthalenetriol 2-(4-aminobenzoate)) at a retention time (RT) of 9.883 and the positional isomer B (3-methyl-1,2,4-naphthalenetriol 1-(4-aminobenzoate)) at a retention time (RT) of 11.143.

From integration of the area of the peaks it could be determined that the sample contained 3.81 wt % of isomer A and 87.46 wt % of isomer B.

With reference to the binary mixture of isomer A and isomer B, the relative amount is 95.83 wt % of isomer B and 4.17 wt % of isomer A, simply obtained as
% of B=(B/A+B)·100; % of A=(A/A+B)·100

Characterization of Isomers A and B Via NMR Spectroscopy

The structure of isomers A and B was confirmed via NMR spectroscopy.

1H and 13C-NMR measurements were carried out on a Varian INOVA 600 spectrometer working, respectively, at 600 and 150 MHz. A sample of aminaphtone was analyzed in a DMSO-d6 solution (20 mg/ml, 25° C.) in NMR tube stored under nitrogen, after having allowed it to reach the equilibrium composition of the two regioisomers. The temperature (accuracy of +0.1° C.) was controlled by means of the Varian's control unit.

g-COSY (gradient COrrelation SpectroscopY) maps were recorded using a relaxation time of 1s with 128 increments of 8 transients each and 4K points.

2D-TOCSY (Total Correlation SpectroscopY) maps were recorded using a relaxation time of 1s and a mixing time of 80 ms; 200 increments were collected, with 8 transients of 4K points each.

2D-ROESY (Rotating-frame Overhauser Enhancement SpectroscopY) maps were registered using a relaxation time of 1 s and a mixing time of 0.5 s; 200 increments were collected, with 8 transients of 4K points each.

For g-HSQC (gradient Heteronuclear Single Quantum Coherence) and g-HMBC (gradient Heteronuclear Multiple Bond Coherence) spectra a relaxation time of 1 s was used, collecting 128-200 increments with 32 transients of 4K points each.

HMBC experiment was optimized for a long-range coupling constant of 8 Hz.

DOSY (Diffusion Ordered SpectroscopY) maps were recorded using a relaxation time of 2 s with 16 transients. 15 gradients were used and δ (2 ms) and Δ (60 ms) were optimized to obtain up to 20% decay of the total signal.

The 1H-NMR spectrum is reported in FIG. 7.

In accordance with the numeration of atoms in the structure of the of the two isomers of aminaphtone reported below, the chemical shift (ppm) for all the carbon atoms is the following:

Isomer B

CH: 10.0 (Me-12), 112.7 (C-17), 119.1 (C-8), 121.9 (C-6), 122.1 (C-5), 125.7 (C-7), 132.1 (C-16)

C quaternary: 111.5, 115.3, 120.1, 124.7, 126.3, 145.8, 147.9, 154.0, 164.9

Isomer A

CH: 10.4 (Me-12), 112.6 (C-17), 121.7 (C-8), 121.8 (C-5), 122.1 (C-5), 124.4 (C-6 e C-7),
132.1 (C-16)

C quaternary: 114.9, 115.1, 124.1, 124.3, 134.0, 136.9, 142.5, 154.0, 164.5

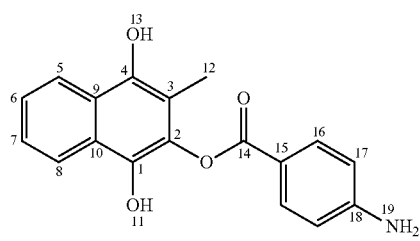

Isomer A

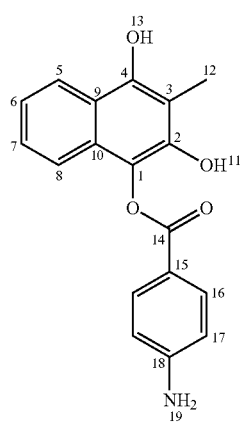

Isomer B wherein:
Isomer A is the 3-methyl-1,2,4-naphthalenetriol 2-(4-aminobenzoate)
Isomer B is 3-methyl-1,2,4-naphthalenetriol 1-(4-aminobenzoate)

The invention claimed is:

1. A mixture of positional isomers of aminaphtone consisting of 3-methyl-1,2,4-naphthalenetriol 2-(4-aminobenzoate) (isomer A) and of 3-methyl-1,2,4-naphthalenetriol 1-(4-aminobenzoate) (isomer B), characterized in that 3-methyl-1,2,4-naphthalenetriol 1-(4-aminobenzoate) (isomer B) is at least 95% by weight of said mixture.

2. An aminaphtone product which comprises the mixture of positional isomer A and isomer B according to claim 1.

3. The aminaphtone product according to claim 2, characterized in that said mixture consisting of isomer A and isomer B is at least 90% by weight of the aminaphtone product.

4. A High-Performance Liquid Chromatography (HPLC) method for identifying the positional isomers of aminaphtone in a product containing them, wherein the method comprises the elution of said product with a mobile phase consisting of two solutions having different polarity, wherein said elution comprises an alternation of at least one isocratic phase and of at least one linear gradient phase, and wherein said elution comprises an alternation of isocratic and linear gradient phases, passing from more polar solutions to less polar solutions.

5. The HPLC method according to claim 4, wherein said elution comprises an alternation of isocratic and linear gradient phases which are repeated at least 3 times.

6. The HPLC method according to claim 4, wherein the more polar solution comprises a solution A being 0.5% of acetic acid in water and a solution C being 0.5% of acetic acid in acetonitrile diluted in methanol, in a volume ratio 60:40.

7. The HPLC method according to claim 4, wherein the less polar solution comprises a solution A being 0.5% of acetic acid in water and a solution C being 0.5% of acetic acid in acetonitrile diluted in methanol, in a volume ratio 35:65.

8. The HPLC method according to claim 4, wherein the volume composition of the mobile phase changes over time as reported in the following table, wherein the phase A represents the volume percentage of the more polar solution and the phase B represents the volume percentage of the less polar solution:

| Time (min) | Phase A % (v/v) | Phase B % (v/v) | Gradient |
| --- | --- | --- | --- |
| 0 | 100 | 0 | Isocratic |
| 3-10 | 100 -> 60 | 0 -> 40 | Linear |
| 10-15 | 60 | 40 | Isocratic |
| 15-20 | 60 -> 0 | 40 -> 100 | Linear |
| 20-30 | 0 | 100 | Isocratic |
| 30-31 | 0 -> 100 | 100 -> 0 | Linear |
| 31-40 | 100 | 0 | Isocratic. |

9. The HPLC method according to claim 4, wherein the stationary phase of the chromatographic column contains alkyl chains.

10. The HPLC method according to claim 9, wherein said stationary phase consists of particles of support material.

11. The HPLC method according to claim 4, wherein the chromatographic column is equipped with a detector.

12. A pharmaceutical composition comprising a mixture of positional isomers A and B of aminaphtone, wherein isomer B is at least 95 wt % of said mixture, and at least one physiologically acceptable excipient.

13. A mixture of positional isomers of aminaphtone consisting of 3-methyl-1,2,4-naphthalenetriol 2-(4-aminobenzoate) (isomer A) and of 3-methyl-1,2,4-naphthalenetriol 1-(4-aminobenzoate) (isomer B), characterized in that 3-methyl-1,2,4-naphthalenetriol 1-(4-aminobenzoate) (isomer B) is at least 95% by weight of said mixture, wherein the isomer A and the isomer B are detected by a High-Performance Liquid Chromatography (HPLC) method for identifying the positional isomers of aminaphtone in a product containing them, wherein the method comprises the elution of said product with a mobile phase consisting of two solutions having different polarity, wherein said elution comprises an alternation of at least one isocratic phase and of at least one linear gradient phase, and wherein said elution comprises an alternation of isocratic and linear gradient phases, passing from more polar solutions to less polar solutions.

14. An aminaphtone product which comprises the mixture of positional isomer A and isomer B according to claim 13.

15. The aminaphtone product according to claim 14, characterized in that said mixture consisting of isomer A and isomer B is at least 90% by weight of the aminaphtone product.

16. The pharmaceutical composition according to claim 12, wherein the mixture of positional isomers A and B consists of 3-methyl-1,2,4-naphthalenetriol 2-(4-aminobenzoate) (isomer A) and of 3-methyl-1,2,4-naphthalenetriol 1-(4-aminobenzoate) (isomer B).

17. The pharmaceutical composition according to claim 16, which comprises an aminaphtone product comprising the mixture of positional isomers A and B.

18. The pharmaceutical composition according to claim 17, wherein the mixture of isomer A and isomer B is at least 90% by weight of the aminaphtone product.

19. The pharmaceutical composition according to claim 12, wherein the mixture of positional isomers A and B consists of 3-methyl-1,2,4-naphthalenetriol 2-(4-aminobenzoate) (isomer A) and of 3-methyl-1,2,4-naphthalenetriol 1-(4-aminobenzoate) (isomer B), and wherein the isomer A and the isomer B are detected by a High-Performance Liquid Chromatography (HPLC) method for identifying the positional isomers of aminaphtone in a product containing them, wherein the method comprises the elution of said product with a mobile phase consisting of two solutions having different polarity, wherein said elution comprises an alternation of at least one isocratic phase and of at least one linear gradient phase, and wherein said elution comprises an alternation of isocratic and linear gradient phases, passing from more polar solutions to less polar solutions.

* * * * *